United States Patent

[11] 3,564,330

| | | |
|---|---|---|
| [72] | Inventor | Harry O. Pfeiffer<br>North Canton, Ohio |
| [21] | Appl. No. | 812,580 |
| [22] | Filed | Mar. 28, 1969 |
| [45] | Patented | Feb. 16, 1971 |
| [73] | Assignee | the United States of America as represented by the Secretary of the Air Force. by mesne assignments |

[54] DEVICE FOR PROVIDING EXPOSURE CONTROL FOR A CAMERA
9 Claims, 5 Drawing Figs.

| [52] | U.S. Cl. | 315/10 |
|---|---|---|
| [51] | Int. Cl. | H01j 31/26 |
| [50] | Field of Search | 315/10;<br>343/5MM |

[56] References Cited
UNITED STATES PATENTS

| 2,786,960 | 3/1957 | Palmer | 315/10 |
|---|---|---|---|
| 2,833,957 | 5/1958 | Horowitz | 315/10 |
| 3,182,125 | 5/1965 | Kampmeyer et al. | 315/10X |

Primary Examiner—Rodney D. Bennett, Jr.
Assistant Examiner—Brian L. Ribando
Attorneys—Harry A. Herbert, Jr. and Richard J. Killoren ABSTRACT: A device to provide an exposure control signal which may be used directly to control camera exposure or may be used to provide a meter indication which may be used to control the iris setting or exposure time of the camera makes use of an electron image correlator, which is normally used to obtain correlation between two electron images, to provide a first signal proportional to photocathode current, which is related to integrated scene brightness. The first signal is used to control the write time of the correlation tube storage element. The first signal is modified by a second signal which is a function of scene detail of the lower brightness portion of the scene which is obtained by adjusting the storage element, backing electrode potential to maximize the correlation function. The second signal is subtracted from the first signal to obtain the exposure control signal.

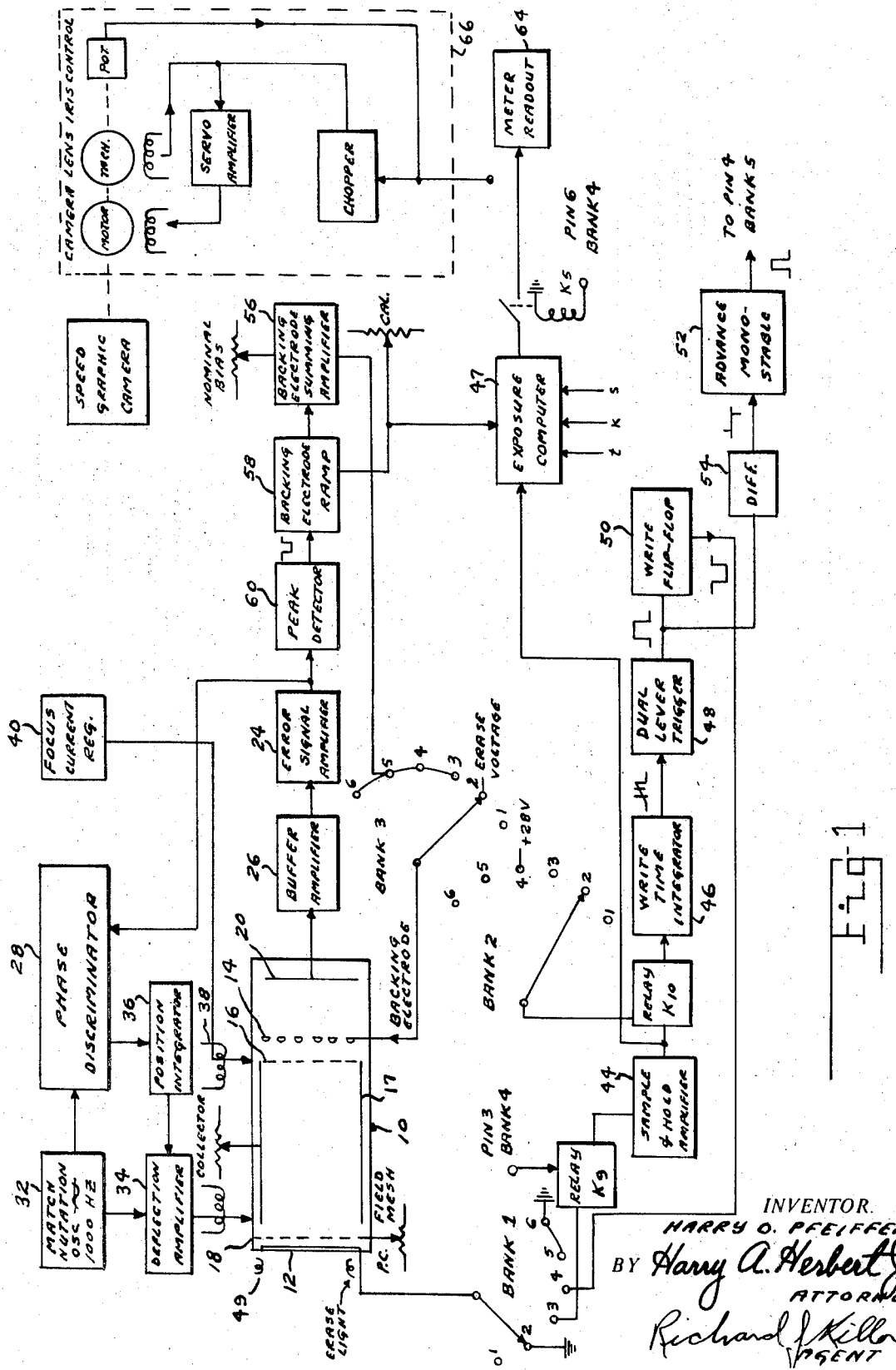

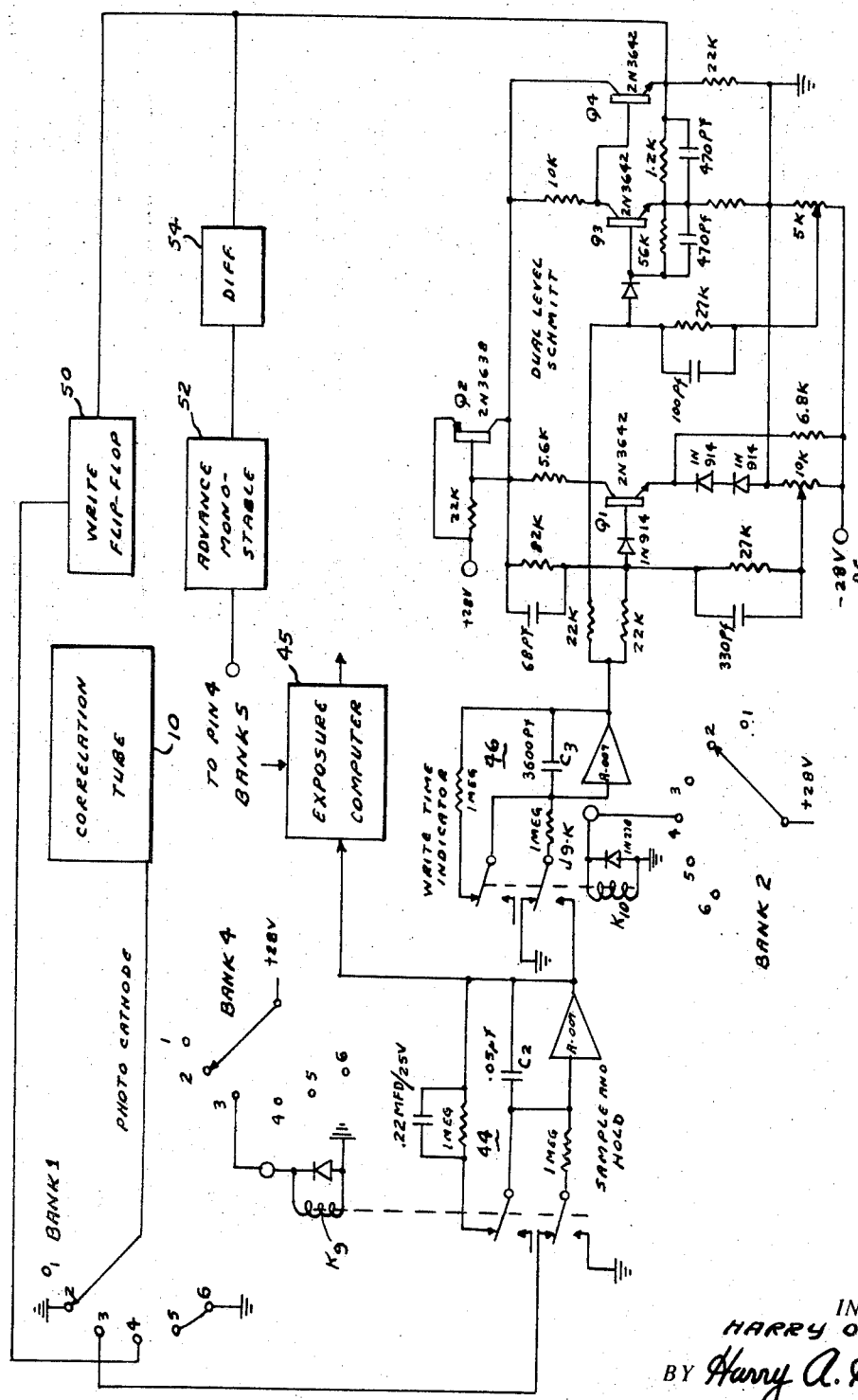

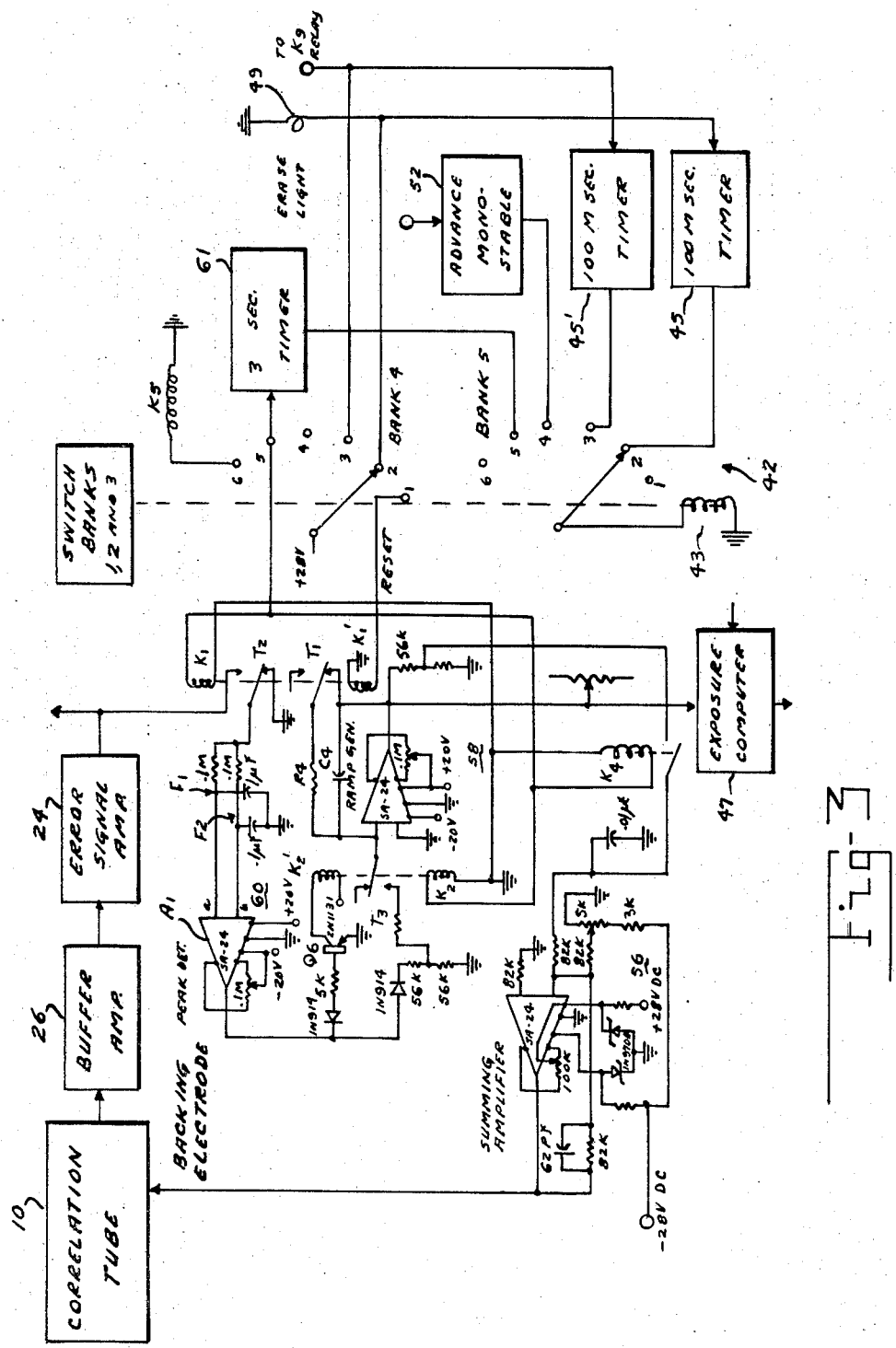

DEVICE FOR PROVIDING EXPOSURE CONTROL FOR A CAMERA

BACKGROUND OF THE INVENTION

When the scene brightness range of a scene to be photographed exceeds the brightness latitude of the photographic film, such as when photographing a scene with a very bright background, there is no way for exposure control to satisfy the exposure requirements completely. Under these conditions, an exposure must be selected that satisfies a predetermined range of brightness of lesser magnitude than the total range of scene brightness. For example, when photographing a photographic scene with a great amount of snow cover, or in the use of high-altitude day cameras with a great amount of cloud cover, the technique selected must be capable of treating snow or cloud brightness so that a maximum amount of terrain information is obtained from the photographs.

Various approaches have been suggested or used for providing better exposure controls for general use. These approaches range from the simple integrating types to complicated scanning types such as those using TV-type tubes. Through the years, there have been arguments for controls using sensors for simply integrating scene brightness; for breaking up a total scene area by scanning into numerous incremental areas and electronically selecting the minimum, mean or high brightness value; for simplified mechanical scanning; and for using incident light measuring devices.

None of these however are well suited for providing exposure control for treating high brightness areas in such a manner that the maximum amount of information is obtained from the low brightness areas.

SUMMARY OF THE INVENTION

According to this invention use is made of an electron image correlator, such as shown in the patent to Steiner, U.S. Pat. No. 3,424,937, or Link et al., U.S. Pat. No. 3,290,546, which correlates an electronic image pattern from the photocathode of an image storage tube with a stored reference electronic image pattern and which produces an output signal that is a function of the correlation between the electronic image patterns. A first signal proportional to photocathode current, which is related to integrated scene brightness is modified by a second signal which is a function of the terrain detail of the lower brightness portion of the scene with the resultant signal being used to control the exposure of the camera either directly or by applying the signal to a meter which is then used to set the lens iris, the exposure time or both. The use of a correlation tube for correcting exposure is feasible since the storage electrode characteristics for such tubes are S-shaped curves which resemble photographic D log E curves.

IN THE DRAWINGS

FIG. 1 is a schematic block diagram of an exposure control device according to the invention;

FIG. 2 is a schematic diagram partially in block form of the write cycle loop for the device of FIG. 1;

FIG. 3 is a schematic diagram partially in block form of the backing electrode loop for the device of FIG. 1;

DETAILED DESCRIPTION OF THE INVENTION

Figure 5:
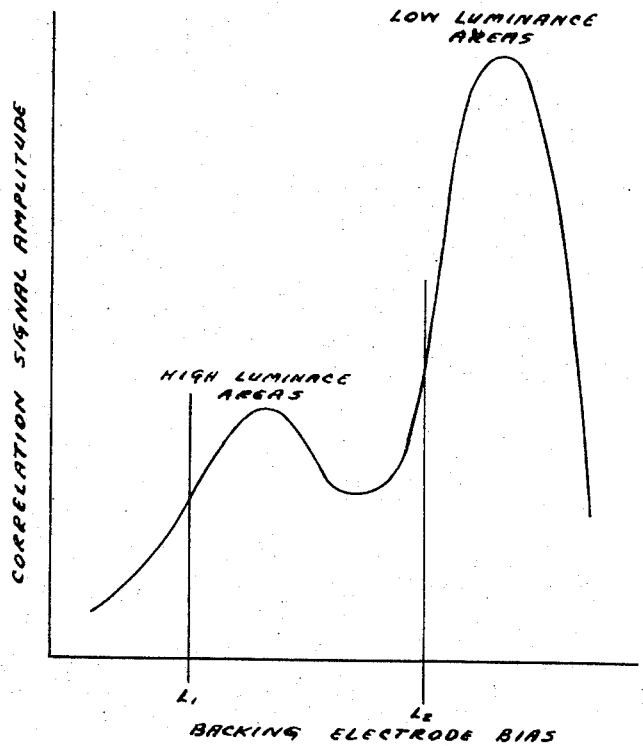
FIG. 5 is a diagrammatic illustration showing a typical characteristic curve of correlation signal amplitude vs. backing electrode potential for a scene with scene detail in two brightness levels.

Reference is now made to FIG. 1 of the drawing wherein reference number 10 shows an image correlation tube having a photocathode 12, an image storage element 14, a collector electrode 16 connected to a drift tube 17, a field mesh electrode 18, and an output electrode 20.

The output electrode 20 is connected to error signal amplifier 24 through a buffer amplifier 26. The output of the error amplifier 24 is fed to a phase discriminator 28. A nutation generator 32 supplies a nutation signal to deflection amplifier 34 and also supplies a reference signal to phase discriminator 28. The output of the phase discriminator 28 supplies a correction signal to position integrator 36 which sends a positioning signal to the deflection amplifier 34. A focus current is supplied to a focus coil shown schematically at 38 from focus current regulator 40. Permanent magnets may be used for focusing if desired. The system thus far described is a conventional correlation circuit which is substantially the same as that shown in the Steiner patent.

This system is modified according to this invention to provide exposure control for a camera. A first signal proportional to integrated brightness is developed in a write cycle loop shown in FIG. 2 in substantially the same manner as in a light meter. Since the correlation tube exposure sensitivity is substantially a constant, the only way to correct for gross changes in luminance in the scene is to vary the tube write time. The first signal which is proportional to integrated brightness is used to set the write time of the correlator tube. The brightness signal is corrected by a second signal proportional to scene detail to obtain an exposure control signal. The second signal is developed in a backing electrode loop shown in FIG. 3. The second signal is obtained by changing the backing electrode potential for the storage element to maximize the correlation function. The operating sequence of erase, sample, write, sharpening, and compute for the correlation tube is provided by a five-bank, six-position stepping switch 42 partially shown in each of the FIGS. 1, 2 and 3.

The first signal is developed and held in the write cycle loop and is modified by the second signal later developed and stored in the backing electrode loop, with the two signals being used in the compute mode to either provide an indication which can be used to manually set the exposure of the camera or to provide a signal which is applied to a conventional iris control circuit to automatically set the exposure for the camera.

The first bank of the stepping switch 42 connects the photocathode at ground potential in the erase, sharpening, and compute modes and to the input of a sample and hold amplifier 44 through relay $K_9$ in the sample position. Relay $K_9$ is energized by bank 4 of the stepping switch in the third or sample position to connect the photocathode to the sample and hold amplifier 44.

Bank 4 of the stepping switch supplies a stepping pulse to the stepping relay 43 at the end of the erase mode through a 100 m./sec. time delay 45 which may be, for example a time delay relay. The sample time is also set at 100 m./sec. by a timer 45' connected between position 3 of bank 4 and position 3 of bank 5 of the stepping switch 42. The erase lights 49 are also energized in position 2 of bank 4.

In the write position of the stepping switch, relay $K_9$ is deenergized to hold the sample in the sample and hold amplifier circuit 44. In the 4th or write position of the stepping switch this signal is applied to the write time integrator 46 through relay $K_{10}$ which is energized by bank 2.

A write time ramp voltage is developed in the write time integrator 46 with the slope of the ramp being determined by the charging rate which is a function of the voltage signal stored in the sample and hold circuit 44. The output of the sample and hold amplifier 44 is also applied directly to one input of exposure computer 47. The output of the write time integrator is supplied to a dual level Schmitt trigger circuit 48 which operates a clamp circuit to control the pulse width in the output of flip-flop circuit 50. The output of the flip-flop 50 supplies a −200v. to −400v. write time pulse to the photocathode 12 through the fourth tap of bank 1. The output of the dual level trigger circuit is also applied to an advance monostable multivibrator 52 through differentiating circuit 54 to provide a stepping pulse to stepping relay 43 at the end of the trigger pulse to move the stepping switch to position 5.

Bank 3 of the stepping switch 42 connects the backing electrode to an erase potential in position 2 or the erase mode and to the output of a summing amplifier 56 in positions 3, 4, 5, and 6 of the stepping switch.

When stepping switch 42 is moved to its fifth position, the photocathode is returned to ground potential and with the backing electrode held at the nominal bias level by the summing amplifier 56.

In position 5 of the stepping switch relays $K_1$, $K_2$, and $K_4$ are energized. Relay $K_1$ has two contacts $T_1$ which open the circuit through the discharge resistor $R_4$ for capacitor $C_4$ in the backing electrode ramp generator 58 and the other $T_2$ which connects the output of error amplifier 24 to the peak detector 60. Relay $K_2$ operates contact $T_3$ to apply a charging potential to capacitor $C_4$ in the ramp circuit. Relay $K_4$ connects the output of the ramp circuit to the summing amplifier 56. The ramp circuit output is also connected to the exposure computer 47. Also in position 5 of bank 4 a 3-sec. timer 61 is started to apply a signal to the stepping relay 43 through position 5 of bank 5. Even though 3 sec. is shown for the delay time of timer 61, the delay need only be set for a sufficient time to permit the completion of the sharpening function.

In position 6 of the stepping switch 42, relay $K_5$ is energized to apply the output of exposure computer 47 to meter 64 or to camera iris control 66.

At the end of the operation the stepping switch 42 may be moved manually to position 1 or may be moved by a reset button connected to position 6 of bank 5. In position 1 reset relay $K_1'$ closes contacts $T_1$ to discharge capacitor $C_4$ through $R_4$ and opens contacts $T_2$. The contact switch can remain in position 1 when the equipment is turned off.

Figure 4:
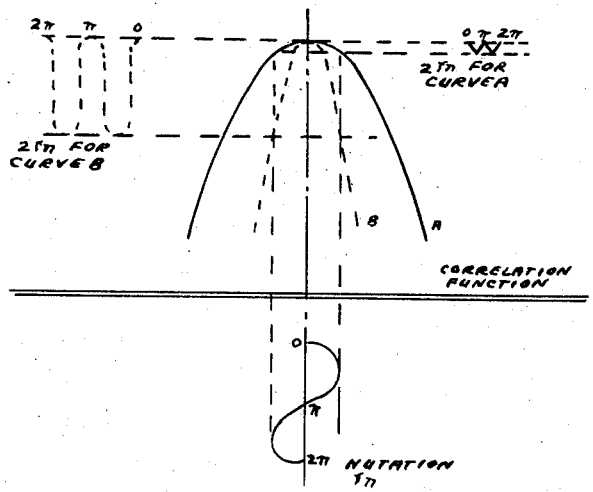
FIG. 4 is a diagrammatic illustration showing how the second harmonic error signal changes as a function of sharpness of the correlation function.

In explaining the operation of the device it will be assumed that there is no image mismatch and that the nutation is across the peak of the correlation curve as shown in FIG. 4. This will be the case when there is no relative movement between the scene and the camera, between the time that the first image is stored on the storage electrode and the time that the second image is directed toward the storage electrode, such as when the camera is fixed with respect to the scene being photographed.

If there is movement such as there would be in the operation of high altitude day cameras, correlation would have to be included with the correlation being accomplished as in the Link et al. and Steiner patents wherein the error signals would be used to bring the images into alignment.

When correlation as well as sharpening is required, it is necessary to stop nutation in one coordinate direction or to time sequence the nutations in each of the x and y coordinate directions. For the purpose of this description sharpening between fixed images will be assumed with a single coordinate nutation being used.

When the equipment is switched on, the stepping switch 42 may be stepped automatically or manually to the second position for the erase mode. In the erase mode the backing electrode is set at erase potential by bank 3 of the stepping switch and the photocathode is held at ground potential by bank 1 of the stepping switch.

The erase lights 49 are energized by bank 4 of the stepping switch which also starts 100-millisecond timer 45 to step the stepping switch 42 to the second position at the end of the 100-millisecond delay. The timer 45 could be set for any time necessary to complete the erase cycle.

In position 3 of the stepping switch the photocathode is connected to the input contact of relay $K_9$, and the backing electrode is connected to the output of summing amplifier 56 where it remains for positions 3, 4, 5, and 6 of the stepping switch. Relay $K_9$ is energized by bank 4 in the third position to store a brightness signal in capacitor $C_2$ in the sample and hold circuit 44. Timer 45' is also energized in this position by bank 4 to apply a signal to bank 5 to energize the stepping relay after the 100-millisecond sample time. This time may also be adjusted to suit particular design requirements.

In position 4 of the stepping switch the photocathode is connected to the output of the flip-flop 50 by bank 1. Bank 2 energizes relay $K_{10}$ to connect the output of the sample and hold circuit 44 to the write time integrator 46 to charge capacitor $C_3$. When bank 4 is moved from position 3 to position 4, relay $K_9$ is deenergized to hold the signal in the sample and hold circuit. Bank 5 connects the stepping relay 43 to the output of the advance monostable multivibrator 52.

When the write time integrator reaches a level of about 1 volt transistor $Q_1$ is turned on which, in turn, turns $Q_2$ on. This then raises the collector voltage of $Q_3$ from a level near zero to a high positive voltage approaching +28 volts. This voltage is coupled by the emitter follower $Q_4$ to the input of the advance monostable multivibrator 52 and to the input of the flip-flop circuit 50. The output of $Q_3$ stays at this level until the write time integrator reaches a level of about 11 volts. This then turns $Q_3$ on, which again drops the $Q_3$ collector voltage to near zero level which is coupled through the emitter follower $Q_4$ to the advance monostable multivibrator 52 and to the flip-flop 50. An output pulse between −200 and −400 volts from the flip-flop 50 is supplied to the photocathode 12 wherein the length of the pulse controls the write time. At the end of the write time, monostable multivibrator 52 in response to a negative going pulse from differentiating circuit 54 corresponding to the trailing edge of the output of trigger circuit 48 sends a pulse to the stepping relay 43 to step the banks to position 5. With the stepping relay in position 5, the photocathode is returned to ground potential by bank 1 and the storage electrode is set at nominal bias level by the summing amplifier 56.

Relays $K_1$, $K_2$, and $K_4$ are energized in position 5 through bank 4 of the stepping switch. Relay $K_1$ connects the error signal amplifier output to the input of the peak detector 60. The peak detector consists of a standard differential input operational amplifier $A_1$ with two R.C. filters $F_1$ and $F_2$ with different time constants for the input circuit. The R.C. filters will filter out the second harmonic of the nutation frequency leaving the envelope to the be applied to the differential amplifier $A_1$. The amplifier $A_1$ is balanced to have a positive saturated output with the $a$ input low and the $b$ input high. This positive voltage is the source for the ramp generator 58 during the sharpening mode. Relay $K_2$ closes the circuit between the peak detector 60 and the ramp generator 58 to apply the charging voltage to the ramp voltage integrating capacitor ($C_4$). The positive voltage holds transistor $Q_6$ off. As the envelope of the second harmonic increases at the inputs of the amplifier $A_1$, the output will remain at positive saturation and the ramp will continue to rise.

When the envelope of the second harmonic begins to decrease, the $a$ input to the amplifier $A_1$ will decrease slower than the $b$ input due to the difference in the R.C. time constants so that $a$ goes high and $b$ goes low. This indicates that the best second harmonic level has just passed. This unbalance of the signal inputs will cause the amplifier $A_1$ to go to negative saturation to turn the transistor $Q_6$ on which energizes coil $K_2'$ which, in turn, opens contacts $T_3$ to open the circuit between the peak detector and the ramp generator to hold the ramp at the level it has reached at that time.

Relay $K_4$ also energized in the fifth position of bank 4 of the stepping switch applies the ramp signal to the summing amplifier where it is added to the nominal voltage to increase the backing electrode potential as capacitor $C_4$ changes which sharpens the correlation signal and brings about the increase in the second harmonic as shown in FIG. 4. Timer 61 also energized in position 5 supplies a delayed signal to the stepping relay 43. The time delay of timer 61 must be made long enough to permit the operation of the peak detector and the ramp generator. Though the timer is indicated as a 3 sec. timer any time delay that will accomplish this may be used.

FIG. 5 shows a typical correlation signal amplitude versus backing electrode bias for a scene which has scene detail in both the high luminance areas and in the low luminance areas. The nominal bias can be set to maximize either peak. To select the first peak the nominal bias would be set at a level near $L_1$ below the first peak and to maximize the second peak the nominal bias would be set at a level near $L_2$ between the first and second peak. For scenes having more peaks any peak that is desired may be selected in this manner. Since the ramp signal is added to the nominal bias level this acts to move the backing electrode bias toward the maximum correlation signal amplitude. Since the peak detector acts to hold the ramp signal at any of the maximum levels, any peak may be selected.

After the integrated brightness signal has been stored in the sample and hold circuit in the write cycle loop and the terrain detail information has been stored in the backing electrode ramp generator, the timer 61 can operate at any time to step the stepping switch 42 to position 6 where relay $K_5$ is energized by bank 4 to apply the output of the exposure computer 47 to the meter 64 or the iris control 66. In the computer 47 the ramp signal is subtracted from the integrated brightness signal to provide the exposure control signal.

When the computer is used to automatically operate the iris control circuit, signals relating to aperture number $f$ and exposure time $t$ would be supplied to the exposure computer 47. Also a constant of proportionality signal K may also be added, if needed. The particular signals added to computer 47 would be determined by the particular operation desired. Though the device has been described as only setting the camera iris, the computer output signal could also be adapted for a combined shutter time and aperture opening for exposure operation. In one device tested it was found that by using integrated brightness alone the exposure would have been set several $f$ stops to the underexposed side of optimum exposure. When the backing electrode loop, which takes scene detail into account, was used to modify the integrated brightness signal an $f$ stop setting at near optimum exposure level was obtained.

There is thus provided an exposure control device for providing an exposure control signal where the scene to be photographed has a wide latitude of brightness levels.

I claim:

1. In combination with an image correlation system having an image storage tube; with a photocathode; an image storage element having a backing electrode, and collector electrode adjacent the storage element; an output means and means, including an electron image deflection means and means for applying a nutation signal of a predetermined frequency to the deflection means, for providing a correlation between a first electron image stored on said storage element and a second electron image directed toward said storage element from said photocathode, a system for providing a film exposure control signal for scenes wherein the brightness range exceeds the brightness latitude of the photographic film, comprising: means for providing a first stored voltage signal proportional to the photocathode current with the photocathode illuminated by said scene; means responsive to said stored signal for controlling the write time of the image storage tube as a function of scene brightness; means responsive to the output of said image storage tube for adjusting the backing electrode potential in response to said output to maximize the correlation signal output of said image storage tube and for storing a second voltage signal proportional to derivative energy in said scene; computer means responsive to the difference of the first stored voltage signal and the second stored voltage signal for providing an output exposure signal as a function of integrated scene brightness and of the maximum spatial derivative energy of the scene being photographed.

2. The device as recited in claim 1 wherein the means for controlling the write time of the image storage tube includes: an integrating circuit for producing a write time ramp voltage; a dual level trigger circuit responsive to the write time ramp voltage for producing a pulse whose width is determined by the slope of said write time ramp voltage; means responsive to the output of said dual level trigger circuit for applying a write potential to said photocathode for the duration of the output pulse of said dual level trigger circuit.

3. The device as recited in claim 2 wherein said means for applying a write potential to the photocathode is a flip-flop circuit, responsive to the output of the dual level trigger circuit.

4. The device as recited in claim 1 wherein said means for adjusting the backing electrode potential of said storage element includes, a summing amplifier including means for applying a fixed nominal bias voltage to said backing electrode and means responsive to the output of said image storage tube to supply a second bias voltage to said summing amplifier for maximizing the correlation signal output of said image storage tube.

5. The device as recited in claim 4 wherein said means for maximizing the correlation signal includes a precision peak detector; a backing electrode ramp generator responsive to the output of said peak detector for producing the second bias voltage applied to the summing amplifier whereby the backing electrode bias increases, as the output voltage of the backing electrode ramp generator increases, to maximize the correlation signal output of the image storage tube.

6. The device as recited in claim 3 wherein said means for adjusting the backing electrode potential of said storage element includes, a summing amplifier including means for applying a fixed nominal bias voltage to said backing electrode and means responsive to the output of said image storage tube to supply a second bias voltage to said summing amplifier for maximizing the correlation signal output of said image storage tube.

7. The device as recited in claim 6 wherein said means for maximizing the correlation signal includes a precision peak detector; a backing electrode ramp generator responsive to the output of said peak detector for producing the second bias voltage applied to the summing amplifier whereby the backing electrode bias increases, as the output voltage of the backing electrode ramp generator increases, to maximize the correlation signal output of the image storage tube.

8. The device as recited in claim 7 including an indicating means and means for applying said output exposure signal to said indicating means.

9. The device as recited in claim 7 including a camera lens iris control; means for supplying said output exposure signal to said camera lens iris control; means for supplying a signal proportional to aperture number and a signal proportional to exposure time to said computer means.